United States Patent [19]
Leombruni, Sr.

[11] Patent Number: 5,669,083
[45] Date of Patent: Sep. 23, 1997

[54] WATER SAVER FOR FLUSH TANKS

[76] Inventor: Roland J. Leombruni, Sr., 319 Twelfth St., Scranton, Pa. 18504

[21] Appl. No.: 763,164

[22] Filed: Dec. 9, 1996

Related U.S. Application Data

[63] Continuation-in-part of Ser. No. 410,044, Mar. 24, 1995, abandoned.

[51] Int. Cl.$^6$ ........................................................ E03D 1/33
[52] U.S. Cl. ........................................... 4/415; 137/425
[58] Field of Search .................................... 137/400, 401, 137/403, 424, 425, 417, 420, 421; 4/415, 353, 381, 382, 383

[56] References Cited

U.S. PATENT DOCUMENTS

| | | | |
|---|---|---|---|
| 2,072,715 | 3/1937 | Jessop | 137/425 |
| 2,309,235 | 6/1943 | Buford | 137/417 |
| 2,311,499 | 2/1943 | West et al. | 137/424 |
| 2,803,262 | 8/1957 | Shellenberger . | |
| 2,841,169 | 7/1958 | Martin et al. | 137/421 |
| 3,040,769 | 6/1962 | Lamb | 137/420 |
| 3,387,308 | 6/1968 | Capra | 4/353 |
| 3,401,717 | 9/1968 | Lamb | 137/421 |
| 3,932,900 | 1/1976 | Huston et al. | 4/415 |
| 4,017,914 | 4/1977 | Young, Sr. | 4/415 |
| 4,700,413 | 10/1987 | Lopez | 4/415 |
| 5,081,720 | 1/1992 | Ames et al. . | |
| 5,442,820 | 8/1995 | Becker | 4/415 |

*Primary Examiner*—Henry J. Recla
*Assistant Examiner*—Charles R. Eloshway
*Attorney, Agent, or Firm*—Sanford J. Piltch

[57] ABSTRACT

A flush valve system is disclosed which sequentially fills and drains the water of the flush tank so as to eliminate wasted water. The flush valve system has a secondary, weighted float and a primary float which controls the water inlet valve that, in turn, controls the entry of water into the flush tank. The secondary float operates to prevent the entry of water into the flush tank until the water in the flush tank is substantially drained, and prevents overlapping operations of filling and draining a flush tank that might otherwise cause water to be wasted.

6 Claims, 2 Drawing Sheets

WATER SAVER FOR FLUSH TANKS

CROSS-REFERENCE TO RELATED APPLICATION

This application is a continuation-in-part of U.S. patent application Ser. No. 08/410,044, filed Mar. 24, 1995 now abandoned.

FIELD OF THE INVENTION

The present invention relates to a bathroom flush tank and, more particularly, to a flush valve system that reduces the amount of water used in a typical bathroom flush tank cycle.

BACKGROUND OF THE INVENTION

Flush valve systems for bathroom flush tanks are well known and some of which are disclosed in U.S. Pat. Nos. 2,803,262 [Shellenberger] and 5,081,720 [Ames, et al.], both of which are herein incorporated by reference.

Bathroom flush tanks consume a relatively large amount of water and, in recent years, concern has grown over the amount of water that may be wasted in the home. One major contributor to this waste is the common flush tank valve systems. More particularly, a vast majority of such flush tanks employs a float that controls an inlet valve which allows water to enter the flush tank. The float control is commonly mounted on an extension arm to provide for a travel path free of obstacles. The float may also be mounted vertically about a guide shaft. In both instances, the floats are disposed for movement consonant with the level of the water in the flush tank.

In these devices, it is common that after the flush control valve has been activated by the movement of the flush tank handle causing a decrease in the height of the water level in the flush tank, the float reacts to the change in water level opening the inlet valve to allow water to run into the flush tank. Simultaneously, the flush control valve, which was activated by the movement of the flush tank handle, allows the water in the flush tank to drain to the bowl. The operation of the float controlled inlet valve allows water to enter the flush tank at the same time the water is being drained from the flush tank. The flush control valve continues to allow water to drain at a faster rate than the inlet valve permits water to flow into the tank until the water level reaches the bottom of the tank and the flush valve closes. When the flush valve closes, the flush cycle ends and the tank begins to fill. The overlapping operations of filling and draining the flush tank conflict with each other and represent a useless waste of a precious resource, water.

Accordingly, it is an object of the present invention to provide for a flush valve system that coordinates the entry and exit of water to and from the flush tank to eliminate any overlapping function so as to reduce the amount of water that might otherwise be wasted during each flush cycle.

It is a further object of the present invention to provide a flush tank having a flush valve system, wherein the drainage of the flush tank and the operation of the float controlled inlet valve are sequential so that the water entering the flush tank is not needlessly drained out of the flush tank.

It is a still further object of the present invention to provide a flush valve system having means for retrofitting the operation of an existing flush valve system so as to reduce the amount of water needlessly wasted in a typical bathroom flush tank.

Still further, it is an object of the present invention to provide a flush tank having a flush valve system that not only saves water but also has appropriate means to adapt to a variety of different flush tank designs.

Further objects and features of the present invention will become evident hereinafter.

SUMMARY OF THE INVENTION

The present invention is directed to a flush tank having means for sequencing the draining and filling operations of a flush tank so as to substantially eliminate the waste of water normally occurring during flush operations.

The flush tank comprises a handle, an actuation member, means for controlling the entrance of water into the flush tank, means for draining the water from the flush tank, a secondary float, and a bracket means for connecting the secondary float to the means for controlling the water inlet valve, the primary float. The handle has means for being mounted on the flush tank for rotating or levered motion. The actuation member has first and second ends with the first end connected to the handle. The means for controlling the entrance of water into the flush tank comprises a valve, a lever arm mechanism, and a primary float. The valve has means for being connected to a water supply and is responsive to the lever arm mechanism as permitted by the primary float. The lever arm mechanism controls the opened-closed state of the valve respectively allowing and preventing the entrance of water into the flush tank. The primary float tracks the level of the water in the flush tank and applies the force to the second end of the lever arm mechanism when the water has reached a first pre-determined level to cause the valve to be placed in its closed state, thereby, preventing the entrance of water into the flush tank. The means for draining the water from the flush tank is connected to the second end of the actuation member and is responsive to the movement of the handle to initiate the draining of the water. The secondary float has means for connecting to the primary float and permitting the primary float to descend when the water has reached a second pre-determined level, less than the first pre-determined level, and after the means for draining has responded to the movement of the handle.

BRIEF DESCRIPTION OF THE DRAWINGS

For the purpose of illustrating the invention, there is shown in the drawings forms which are presently preferred; it being understood, however, that the invention is not limited to the precise arrangements and instrumentalities shown.

BRIEF DESCRIPTION OF THE PREFERRED EMBODIMENTS

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

Figure 1:
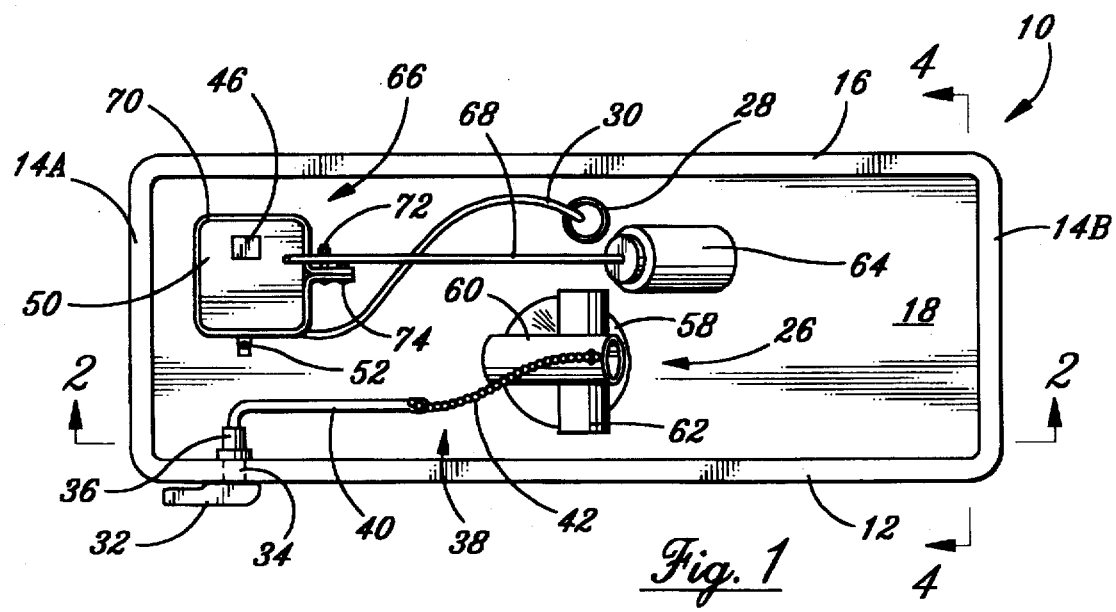
FIG. 1 is a top plan view of a flush valve system of the present invention within a flush tank.
Figure 2:
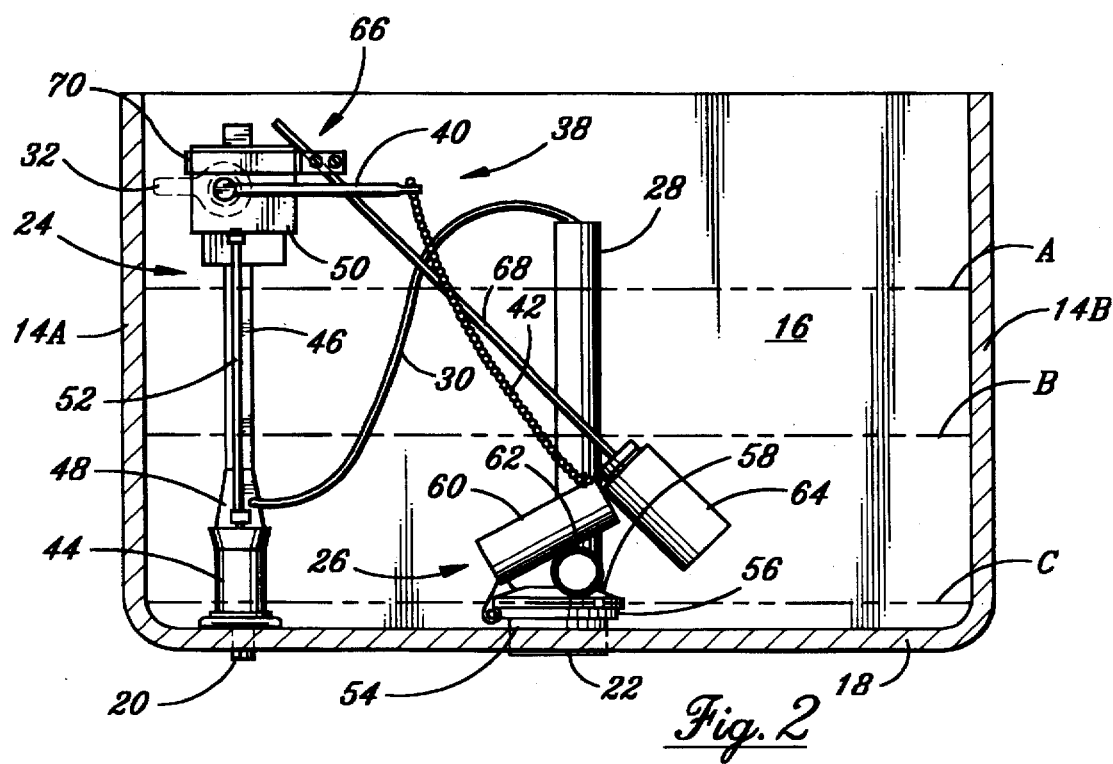
FIG. 2 is a sectional view of the flush valve system of the present invention taken along Line 2—2 of FIG. 1 showing the flush tank with the front wall removed.
Figure 3:
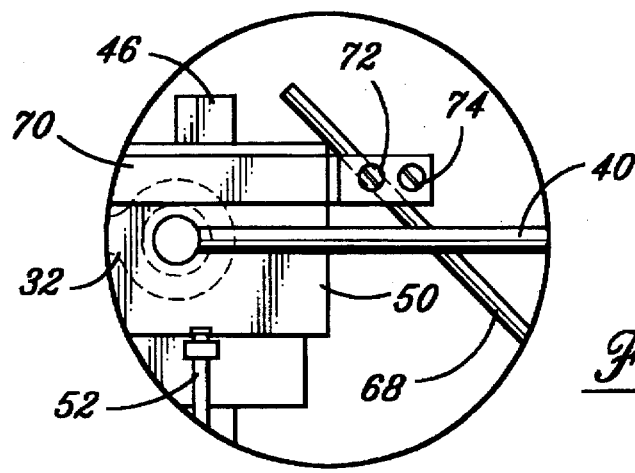
FIG. 3 is an enlarged view of the attachment and angular retention means of the flush valve system of the present invention.

Referring now to the drawings in detail, where like numerals refer to like parts or elements, there is shown in FIGS. 1 and 2 a flush tank 10 having a flush valve system of the present invention which may be described, in general, as follows.

The flush valve system is comprised of the elements shown in FIGS. 1, 2 and described below which are all comprised of water resistant materials. The flush tank 10, as shown in FIG. 2 with its front face 12 removed, has side walls 14A and 14B, a rear wall 16 and a bottom 18 having a water inlet opening 20 and a drainage opening 22. The side walls 14A and 14B, the rear wall 16 and the front face 12 all support a cover (not shown).

Figure 4:
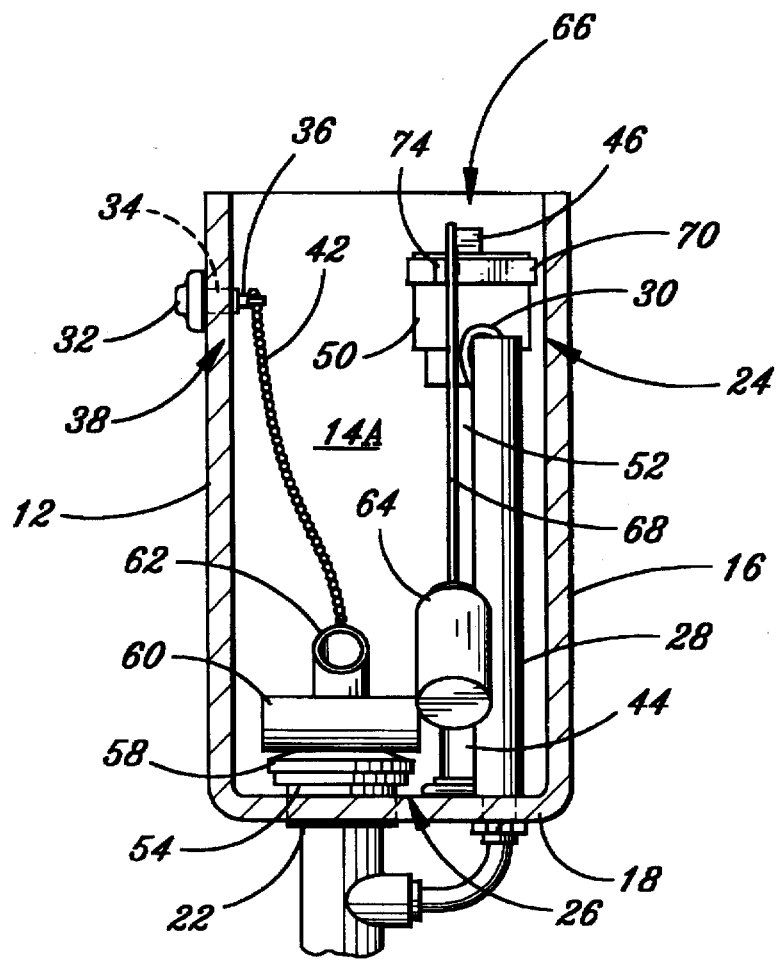
FIG. 4 is a sectional view of the flush valve system of the present invention taken along Line 4—4 of FIG. 1 showing the flush tank with one side wall removed.

The flush valve system comprises a flush control means 24, serving as a means for controlling the entry of water into the flush tank 10, and a flap valve assembly 26 serving as a means for controlling the exit of water from the flush tank 10. As shown in FIG. 4 the flush valve system further comprises an overflow drain 28 interconnected to the opening 22 through the outlet valve in the bowl member 58 in the conventional manner. A flexible tube 30 is coupled to the float control means 24 to supply water to the flush tank 10 when the inlet valve is open. The flush valve system further comprises a flush handle 32 having a shaft 34 which is coupled to means 36 which rotatably mounts the handle 32 to the flush tank 10. The flush valve system also comprises an actuation member 38 comprising a solid rod 40 and a flexible member 42, respectively serving as the first and second ends of the actuation member 38.

The flexible tube 30 is coupled to the inlet valve (not shown) within the body 44 of the float control means 24 and supplies water to the overflow drain pipe 28 which, in turn, supplies water to the toilet bowl through the outlet valve in the member 58 at the bottom of the overflow pipe 28. The inlet valve may also supply water through a separate opening in the body 44 (not shown) directly into the flush tank 10 when actuated in addition to, or instead of, the flexible tube 30.

The flush control means 24 is a conventional type and may be constructed from controls of major manufacturers. The flush control means 24 depicted in FIGS. 1 and 2 is a Fluidmaster® Model 200A. The Fluidmaster® control valve is well-known and reference may be made to its instruction manual for further details of its operation, and also the inherent operation of the flush control means 24. For completeness of the description, enough details of the operation of the flush control means 24 are given herein so as to provide an appreciation of the principles of the present invention.

The flush control means 24 has a body 44 which mates with and is connected to the entrance opening 20 of the flush tank 10 and houses a water inlet valve which allows for the entry of water into the flush tank 10 through the tube 30. The flush control means 24 also has a shaft and guide means 46 arranged above a conical support 48 which is configured to have a rectangular cross-section along which the primary float 50 moves in a vertical translational motion in accordance with the level of the water in the tank 10.

The inlet control valve is responsive to a control arm 52 depending from the float 50 which controls the opening and closing of the water inlet valve in accordance with the position of the float 50 to either allow or prevent the entry of water into the flush tank 10 via the tube 30. The control arm 52 links the float 50 to the water inlet valve so that the valve will respond to the vertical position of the float 50. Further, the primary float 50 is mounted about the shaft and guide means 34 so as to be disposed for vertical movement within the flush tank 10 (without lateral or rotational movement) along the shaft 34. The primary float 50 tracks the level of water in the flush tank 10 in a manner to be described hereinafter.

The flap valve assembly 26 rests over the drainage opening 22, and more particularly, on an outlet fitting 54 disposed through the drainage opening 22. The outlet fitting 54 carries a top portion 56 contoured to serve as a seat for the flap valve 26. The flap valve assembly 26 comprises a bowl member 58 contoured to match and rest on and within the seat 56, and a tubular member 60 preferably having one of its ends closed so as to serve as a cup member and which is attached above the bowl member 58. The cup member 60 captures a pre-determined amount of water during flushing which provides a preferentially positioned weight source to assist in the closing of the flap valve assembly 26 when the water level in the flush tank 10 reaches its fully drained level. The flap valve assembly 26 further comprises a tubular member 62 which is attached to the cup member 60 and supports the cup member at a pre-determined angular relationship to the seat 56. The cup member 60 has a hook or opening allowing for the attachment of the flexible member 42 to actuate the flap valve 26 causing the tank to drain the water. The flexible member 42 which may be a chain or other non-elastic, flexible member. The flap valve assembly 26 has pivotal means that is attached to the seat 56.

In operation, the flush valve system shown in FIGS. 1 and 2 provides for a first pre-determined level of water A to be stored in the flush tank 10. The water stored in the flush tank when the flush tank 10 has the first pre-determined level of water A is used in the flush operation. A second level of water B includes residual water remaining after the drainage or flush cycle of the flush tank 10. The flush cycle is initiated by the downward or rotational movement of handle 32 which causes the actuation member 38, i.e. the rod 40 to rise pulling chain 42 upward, which pulls the flap valve assembly 26 and bowl member 58 upward and away from the seat 56. This motion allows the water to drain from the flush tank 10 through the outlet fitting 54. As the water level drops from its "full" level A, the primary float 50, tracking the decreasing water level, descends from its position at the top of guide shaft 46 to a lower position along the shaft 46 contacting the support 48. The downward movement of the primary float 50 causes the water inlet valve in the body 44 to open and allow water to enter the flush tank directly though the opening in body 44. As discussed in the "Background" section, allowing water to enter into the flush tank 10 at the same time that water is allowed to drain from the flush tank 10 creates an unnecessary waste of water due to the flap valve assembly 26 remaining open until the water level is reduced in the tank 10 to its lower level, level B. It is estimated that such simultaneous action wastes amounts of water approximating one gallon of water for each flush cycle of a bathroom flush tank. The present invention corrects for such wastage by requiring the sequential occurrence of the drain and refill portions of such a flush cycle.

The elements of the present invention are essentially the same as and have the same function as those described above. The improvement of the present invention provides for the addition of a secondary float 64 and means 66 for coupling the secondary float 64 to the primary float 50. The secondary float 64 is comprised of an elongated float having a pre-determined volume and weight which produce a buoyant force which allows float 64 to remain suspended under the water level in the flush tank 10 until, during the drain portion of a flush cycle, the water reaches a third pre-determined level C to be described more fully hereinafter.

The means 66 for coupling secondary float 64 the primary float 50 comprises a band 70 having a pre-determined length so as to not only encompass the primary float 50 but also to provide a means to secure the band 70 in fixed position onto the primary float 50. The preferred method of attachment is to encircle the primary float 50 by the band 70 at or near its top, but other positions having the same functional relationships may also be suitable. A bolt and nut arrangement dimensioned, fastening means 72, 74 to be insertable into openings in the band 70 and then threadedly tightened onto each other hold the band in position. Fastening means 72 also provides for the pivotal attachment of the rod 68 which is engaged sufficiently to retain the rod within an angular rotational position, said angular position being preferred to be in the range of 30° to 45° below the horizontal plane of the water level in the tank 10.

In operation, and in a manner as described with reference to FIGS. 1 and 2, when the handle 32 is depressed, it causes the flip valve assembly 26 to pivot upward to its open position, which allows the water to drain from the flush tank 10 reducing the water level from the "full" level A. Unlike prior art flush valve systems, the secondary float 64 of the present invention is mounted to the rod 68 at the predetermined angular relationship. Thus, the primary float 50 is captured and maintained in its position at the top of the fluid shaft 46 by the buoyance of the secondary float 64 and its vertical position in relation to the primary float 50. In this manner the secondary float 64 and the means 66 for releasably capturing the primary float 50 keep the water inlet valve closed and prevent the entry of water into the flush tank 10. As the water level drops to the third pre-determined level C, the secondary float 64, because of its floatational characteristics, follows the reduction of the level of the water in the flush tank and moves downward. The downward movement of the secondary float 64 permits the primary float 50 to descend a lesser distance than normal, but sufficient to cause the water inlet valve to open allowing water to enter into the flush tank 10 directly through the opening in body 44. As the level of water in the flush tank 10 approaches the third pre-determined level C, flap valve assembly 26 begins to close due to the reduction in water level by reseating the bowl member 58 onto the seat 56 which ends the drain cycle of the flush tank 10 so that the water now entering by the actuation of the water inlet valve does not find its way out of the flush tank 10. The substantially simultaneous release of the primary float 50 and the closing of the drain by closure of the flap valve assembly 26 creates the sequential draining of the water in the flush tank 10 followed by the opening of the water inlet valve and the refilling of the tank 10 without any substantial use of water not needed in the flush cycle.

As the tank 10 begins to refill, water envelops secondary float 64 which becomes submerged before beginning to rise. This delay in upward buoyant motion is due to counter forces which act against the buoyant force exerted by the water upon the secondary float 64. These counter forces are comprised of the weight of float 64 and the weight of primary float 50 as transferred by the coupling means 66. Thus, when secondary float 64 is resting on the bottom of the tank 10, the water will reach intermediate level B before the buoyant force of the water will overcome its own weight and the weight of float 50. Once the counter forces are overcome, secondary float 64 will rise with the level of the water permitting primary float 50 to also ascend with the level of the water which will ultimately cause the water to stop flowing into the tank 10 as the inlet valve is closed as the float 50 reaches the top of shaft 46.

Compared to normal flush valve systems, the flush valve system of the present invention will fill the tank 10 with a lesser volume of water. This is because secondary float 64 will permit primary float 50 to the shut-off position before the tank 10 is completely filled. However, an adequate amount of water is supplied to the tank 10 to insure proper flushing. Indeed, conventional flush valve systems fill tank 10 beyond the amount of water actually needed for proper flushing resulting in a waste of water. During a drought when water needs to be conserved, the public is often directed to place pre-filled containers in the tank 10 to occupy volume insuring less water will be used to fill tank 10. The present invention terminates the flush cycle before the water has completely filled the tank. If a higher initial storage level A is desired the weight of secondary float 64 can be adjusted causing secondary float 64 to become more submerged before it starts to rise, thus providing a higher initial pre-determined level A. However, it should be recognized that the heavier the secondary float 64, the sooner the secondary float 64 will begin to descend during the flush cycle which may cause a slight overlap between the fill and flush cycles.

The overall effect of the operation of the flush valve system of the present invention is to substantially reduce or even eliminate the water typically wasted during flush cycles of prior art flush valve systems. More particularly, the flush valve system of the present invention reducing the non-overlapping operations of the flush tank 10 by first substantially draining the flush tank 10 and then allowing the filling of the flush tank 10. Reducing these overlapping operations each time the flush tank 10 is cycled saves about one (1) gallon of a precious substance, water, for each cycle of the flush tank 10.

It should be also recognized that the third pre-determined level C may be preselected by the adjustment of the position of the secondary float 64 within the tank by changing the angular position of the elongated rod 68 or the extension positions of the secondary float 64. For example, the secondary float 64 may be threadedly moved upward (or downward) on the rod 68 closer to (or away from) the band 70 at the top of the primary float 50. With an upward movement along the rod 68, the third pre-determined water level C will range higher causing the inlet valve to open sooner to accommodate differently sized flush tanks or a different arrangement of elements combined to make a flush valve system. If the secondary float 64 is moved away from the primary float 50 downward along the rod 68, the third pre-determined water level C will be lower causing the water inlet valve to open even later. Such adjustments of the secondary float 64 on the elongated rod 68 allow the present invention to be adaptable to different designs of the flush control means and flush tanks holding differing volumes of water.

The band 70 for attaching the secondary float 64 to the primary float 50 may be attached at any location so long as the elongated rod 68 and secondary float 64 are free to operate as described without any impediments to their movement. The rod 68 may be angled differently and/or shorted by rotating the secondary float 64 upward along the rod to shorten the overall length to accommodate differing physical arrangements of flush valve systems and/or different parts of attachment to the flush control means for the particular flush tank. It should now be appreciated that the practice of the present invention provides for a flush valve system having means for substantially reducing, or even eliminating, waste of water that would otherwise occur during typical flush tank cycles.

The present invention may be embodied in other specific forms without departing from the spirit or essential attributes thereof and, accordingly, the described embodiments are to be considered in all respects as being illustrative and not restrictive, with the scope of the invention being indicated by the appended claims, rather than the foregoing detailed description, as indicating the scope of the invention as well as all modifications which may fall within a range of equivalency which are also intended to be embraced therein.

I claim:

1. A flush tank for holding and releasing water comprising:
   a. a handle having means for being rotatably mounted to the flush tank;
   b. an actuation member having first and second ends with said first end being connected to said handle;
   c. means for controlling the entry of water into said flush tank, said means comprising:
      i. a valve means connected to a water supply and responsive to a valve actuation mechanism for permitting water to enter said flush tank;
      ii. said actuation mechanism controlling the state of said valve respectively allowing and preventing the entry of water into said flush tank; and
      iii. a primary float means attached to said valve actuation mechanism being vertically disposed for movement, said primary float means tracking the level of water in said flush tank causing said valve to be placed in its closed state when said water has reached a first pre-determined level preventing the entry of water into said flush tank;
   d. means for draining the water from said flush tank, said draining means being connected to said second end of said actuation member and responsive to the movement of said handle to initiate said draining; and
   e. a secondary float having means for coupling said primary float to said secondary float, said coupling means comprising:
      i. a band having a pre-determined length so as to encompass said primary float and leave first and second overlapping edges each having first and second openings; and,
      ii. fastening means dimensioned to be insertable into said openings in said band and tightened to sufficiently engage the primary float and to retain the secondary float at a pre-determined downward angular position so as to capture said primary float and retain said primary float in its uppermost position until said water has reached a second pre-determined level which is less than said first pre-determined level.

2. The flush tank according to claim 1, wherein said secondary float comprises a tubular member having a pre-determined length with one end threadedly connected to an elongated rod having a pre-determined length and having mating threads for threadedly and adjustably engaging said tubular member at a pre-determined distance relative to said means for releasably capturing said primary float, a second end of said rod being connected to said primary float by said coupling means and arranged at a pre-determined downward angular position.

3. The flush tank according to claim 1, wherein said pre-determined angular position of said elongated rod and secondary float is in the range of 30° to 45° below the horizontal plane of the water level of said tank.

4. The flush tank according to claim 1 further comprising a flush tank overflow drain interconnected to said means for draining the water from said flush tank.

5. The flush tank according to claim 1, wherein said actuation member comprises a solid and a flexible member respectively serving as said first and second ends of said actuation member.

6. The flush tank according to claim 1, wherein said means for draining the water comprises:
   a. a fitting adapted to be placed in the drain opening of said flush tank, said fitting carrying a top portion serving as a seat;
   b. a bowl member contoured to match and releasably rest on said seat;
   c. a cup member attached to said bowl member for counter balancing said bowl member downward during the flush cycle; and
   d. a pivotal hinge means for attaching said bowl member to said seat member.

* * * * *